United States Patent [19]

Fukushima et al.

[11] 3,720,631

[45] March 13, 1973

[54] SHEET MATERIALS OF EXCELLENT DURABILITY AND METHOD OF MANUFACTURING THE SAME

[75] Inventors: Osamu Fukushima; Kazuo Nagoshi; Toshiaki Iwamoto, all of Kurashiki, Japan

[73] Assignee: Kuraray Co., Ltd., Kurashiki, Japan

[22] Filed: Sept. 28, 1970

[21] Appl. No.: 76,235

Related U.S. Application Data

[63] Continuation-in-part of Ser. No. 701,101, Jan. 29, 1968, abandoned.

[30] Foreign Application Priority Data

Feb. 10, 1967  Japan................................42/8691

[52] U.S. Cl. ....260/2.5 AY, 117/135.5, 117/161 KP, 260/2.5 AM, 260/2.5 AN
[51] Int. Cl. .........................C08g 22/44, C08g 22/08
[58] Field of Search..............260/2.5 AY; 117/135.5

[56] References Cited

UNITED STATES PATENTS

| | | | |
|---|---|---|---|
| 3,208,875 | 9/1965 | Holden | 117/135.5 |
| 3,348,963 | 10/1967 | Fukashima et al. | 117/63 |
| 3,100,721 | 8/1963 | Holden | 117/135.5 |
| 3,000,757 | 9/1961 | Johnston et al. | 117/63 |
| 3,236,812 | 2/1966 | McElroy | 260/75 |
| 3,369,925 | 2/1968 | Matsushita et al. | 117/63 |
| 3,590,112 | 6/1971 | Cirardi | 264/321 |

*Primary Examiner*—Donald E. Czaja
*Assistant Examiner*—H. S. Cockeram
*Attorney*—Stevens, Davis, Miller & Mosher

[57] ABSTRACT

A highly durable sheet material using for synthetic leather is prepared by dipping a layer of a solution of a polyurethane elastomer which is derived from both a polyester having a molecular weight of 800 to 3000 and a polyether having a molecular weight of 800 to 3000 as soft segments, the molar ratio of the polyester to the polyether being from 10:90 to 65:35, and in which elastomer the weight of nitrogen atoms contained in the urethane groups ranges from 3.8 to 6 percent of the total weight of the polyurethane elastomer, into a coagulation bath composed of a solvent and a non-solvent for the polyurethane elastomer at a ratio by weight ranging from 20:80 to 70:30, thereby coagulating said layer of the elastomer into a microporous structure.

7 Claims, No Drawings

SHEET MATERIALS OF EXCELLENT DURABILITY AND METHOD OF MANUFACTURING THE SAME

This application is a continuation-in-part of our copending application Ser. No. 701,101, filed Jan. 29, 1968, now abandoned.

The present invention relates to durable sheet materials comprising a microporous layer of polyurethane elastomer.

It is known that sheet materials comprising a microporous layer of a polyurethane elastomer bonded to a substrate such as a woven or non-woven fabric are suitable substitutes for leather.

In manufacturing such sheet materials, it has hitherto been the usual practice to use polyurethane elastomers which contain either a polyester or polyether as the soft segment.

However, polyurethane elastomers, in which a polyether is the soft segment, have a drawback in that they cannot be easily formed into microporous layers by the wet coagulation method. On the other hand, those using a polyester as the soft segment will readily form microporous layers upon similar treatment, but have the disadvantage of being less durable than the elastomers containing a polyether as soft segment because polyesters are susceptible to hydrolysis (particularly in the presence of alkalis) and the breakdown of the molecules due to the hydrolysis of the polyester will result in poor physical properties such as reduction of tensile strength and elongation.

It is an object of the present invention to provide a durable sheet material comprising a microporous polyurethane elastomer and a method of manufacturing the same.

The sheet materials according to the invention are characterized by a microporous layer of a polyurethane elastomer which is derived from both a polyester having a molecular weight of 800 to 3000 and a polyether having a molecular weight of 800 to 3000 as soft segments, an organic diisocyanate and a chain extender having two active hydrogen atoms, the molar ratio of the polyester to the polyether being from 10:90 to 65:35 and in which elastomer the weight of nitrogen atoms contained in the urethane groups ranges from 3.8 to 6 percent, preferably from 3.8 to 4.2 percent, of the total weight of the elastomer.

The sheet materials of the invention may be obtained by dipping a layer of a solution of the polyurethane elastomer supported upon a substrate into a coagulation bath comprising a solvent and a non-solvent for the polyurethane elastomer suitably in a weight ratio ranging from 20:80 to 70:30 and thereby coagulating the solution into a microporous structure, and then, if desired, stripping the coagulated layer from the substrate.

Polyesters which may be used as soft segments in the polyurethane elastomers include, for example, those obtained by the polycondensation of an aliphatic dicarboxylic acid such as adipic acid or sebacic acid and a glycol, such as ethylene glycol, propylene glycol, butylene glycol or hexamethylene glycol or a mixture thereof, and polyesters such as polycaprolactone which is obtained by ring-opening polymerization of a lactone.

Polyethers which may be used include polyalkylene ether glycols, such as polyethylene ether glycol, polypropylene ether glycol, polytetramethylene ether glycol, and polyhexamethylene ether glycol. Copolymerized polyethers such as polyethylene propylene ether glycol and block copolymerized polyethers composed of ethylene oxide and tetramethylene oxide portions may also be used.

Suitable organic diisocyanates for use in the preparation of the polyurethane elastomers include aromatic diisocyanates, such as naphthalene diisocyanates, diphenylmethane diisocyanates, diphenyl diisocyanates, and tolylene diisocyanates. Aliphatic diisocyanates, such as hexamethylene diisocyanate may also be used.

As chain extenders having two active hydrogen groups for Zerewetinoff's reaction for chain extension, there may be used glycols, such as ethylene glycol, propylene glycol, butylene glycol and hexamethylene glycol as well as diamines, such as o, o'-dichloro-p, p'-diaminodiphenylmethane, m-phenylene-diamine, 4-methyl-m-phenylenediamine, ethylenediamine, and hexamethylene diamine, though in many cases glycols give better results.

As noted above, the polyurethane elastomers used in the present invention contain both polyester and polyether as the soft segments, and such elastomers in which the polyester and polyether occur in blocks, are preferred to those in which the two are dispersed at random.

If the amount of polyether is decreased and that of polyester increased, the resulting polyurethane elastomer tends to deteriorate in quality. If the amount of polyether is increased and that of polyester decreased it is difficult to obtain a material having a microporous structure. When the molar ratio of polyester to polyether as soft segments is maintained within the range of 10:90 to 65:35, good results will be obtained both in forming the desired microporous structure and in respect of durability.

The weight of nitrogen atoms contained in the urethane groups in the polyurethane elastomer is in the range of 3.8 to 6 percent, preferably from 3.8 to 4.2 percent, of the total weight of the polyurethane elastomer. If the weight of nitrogen is appreciably greater than 6 percent, the resulting sponge structure will be so hard that it will fail to provide adequate touch and physical properties for the sheet material. Conversely if the weight of nitrogen is appreciably below 3.7 percent, the polymer will become too soft to be coagulated to a sponge structure by the wet method, without being subjected to further treatment.

Solvents available for dissolving the polyurethane elastomers in accordance with the invention include N,N-dimethyl formamide (hereinafter referred to as DMF), dimethyl sulfoxide, tetrahydrofuran, tetramethylurea, N,N-dimethyl acetamide, N,N-diethyl formamide, dioxane, and gamma-butyrolactone.

A non-solvent for the elastomer, such as water, is used in the coagulation bath for coagulating the polyurethane elastomer solution. If the non-solvent is used alone, the coagulation proceeds too rapidly for a uniform reaction and a skin is formed on the surface with a tendency to wrinkle. To prevent this a mixture of a non-solvent and a solvent is used to effect a slower coagulation. If, however, the solvent content is too great, the coagulation will be unduly slowed down or will not take place at all. Therefore, the composition of a coagulation bath is preferably such that the ratio by weight of the solvent to the non-solvent is within the range of 20:80 to 70:30.

The polyurethane elastomer solution may contain pigments, surface active agents and stabilizers, and also other polymers, such as polyacrylonitrile, polyvinyl acetate, polyvinyl chloride, polymethacrylic ester, polyacrylic ester, and halogenated vinyl polymers.

In order that the invention may be well understood the following examples are given by way of illustration only. In the examples all parts and percentages are by weight unless otherwise stated.

EXAMPLE 1

A polyurethane elastomer, in which the weight of nitrogen atoms contained in the urethane groups was 4 percent of the total weight of the elastomer, was synthesized from 800 parts of mixed polymer glycol of 30 percent of polytetramethylene ether glycol with a molecular weight of 1200 and 70 percent of polybutylene adipate glycol with a molecular weight of 2000, 497 parts of p,p'-diphenylmethane diisocyanate, and 93.5 parts of ethylene glycol.

A solution was prepared from 20 percent of the polyurethane elastomer thus obtained, 1 percent of carbon black, and 79 percent of DMF.

The solution was poured onto a glass plate to form a layer of 1 mm in thickness, the coated plate dipped in a coagulation bath consisting of 60 parts of DMF and 40 parts of water and kept at a temperature of 60° C to effect coagulation of the layer into a microporous structure. The resultant material was washed with water to remove DMF and then dried with hot air at 90° C.

The film thus produced had a sponge structure which was smooth on the surface and was composed of fine pores of several microns in diameter. When immersed in hot water at 90° C for 4 days, the film exhibited a negligible decrease in the degree of polymerization. When the film was immersed in a 3 percent aqueous ammonia solution at 70° C for 3 days, it still retained 80 percent of its initial viscosity. By contrast, a polyurethane elastomer of a similar composition having a nitrogen content of 4 percent but in which polybutylene adipate alone was used as the soft segment when immersed in 3 percent aqueous ammonia solution at 70° C for 3 days, retained only 50 percent of its original viscosity and tore when drawn and thus proved useless.

EXAMPLE 2

A polyurethane elastomer having a nitrogen content based on diisocyanate of 4 percent was synthesized from 1000 parts of a mixed polymer glycol composed of 43 percent of polypropylene ether glycol with a molecular weight of 1000 and 57 percent of polyethylene propylene adipate glycol (ethylene:propylene=) with a molecular weight of 2000, 616 parts of p,p'-diphenylmethane diisocyanate, and 109 parts of ethylene glycol.

A solution was prepared from 25 percent of this polyurethane elastomer with 72 percent of DMF, 1.5 percent of sorbitan monostearate and 1.5 percent of stearyl alcohol.

A non-woven fabric formed of 2-denier nylon-6 staple fibers was impregnated with the solution thus prepared, and, further, a solution consisting of 22 percent of the polyurethane elastomer, 76.5 percent of DMF, 0.5 percent of stearyl alcohol, and 1 percent of carbon black was poured over one side of the fabric to give a layer 0.8 mm in thickness. The fabric was then dipped in a coagulation bath consisting of 50 percent of DMF and 50 percent of water at 55° C to effect coagulation, washed with water to remove DMF, and was finished by embossing and coloring as sheet material.

This sheet material had a soft touch and proved to be an excellent material with good resistance to heat and alkali.

EXAMPLE 3

A polyurethane elastomer, in which the weight of nitrogen atoms contained in the urethane groups was 4.3 percent of the total weight of the elastomer, was synthesized from 546 parts of a mixed polymer glycol formed of 80 mole percent of polytetramethylene ether glycol with a molecular weight of 1200 and 20 mole percent of polyethylene propylene adipate glycol (ethylene:propylene=mole:1 mole) with a molecular weight of 2000, 384 parts of p,p'-diphenylmethane diisocyanate, and 70 parts of ethylene glycol.

A solution of 20 parts of this polyurethane elastomer with 1 part of carbon black and 79 parts of DMF was prepared.

This solution was poured onto a glass plate to give a layer of 1 mm in thickness, and the coated plate was dipped in a coagulation bath composed of 60 parts of DMF and 40 parts of water at 60° C, and was thereby coagulated into a microporous structure. The layer was washed with water to remove DMF, and the resultant product was dried in hot air at 90° C.

The film thus obtained had a microporous structure having a smooth surface and fine porous of about several microns in diameter. When immersed in hot water at 90°C for 4 days, the decrease of the degree of polymerization was slight and the film was durable and did not deteriorate in quality.

EXAMPLE 4

A polyurethane elastomer, in which the nitrogen content in the urethane groups was 5.2 percent of the total weight, was synthesized from 442 parts of a mixed polymer glycol composed of 70 mole percent of polypropylene ether glycol with a molecular weight of 1000 and 30 mole percent of polybutylene adipate glycol with a molecular weight of 2000, 464 parts of p,p'-diphenylmethane diisocyanate, and 94 parts of ethylene glycol.

A solution was prepared from 18 percent of this polyurethane elastomer with 1 percent of carbon black and 81 percent of DMF.

The resulting solution was poured onto a glass plate to form a layer of 1 mm in thickness, and the coated plate was then dipped in a coagulation bath composed of 50 percent of DMF and 50 percent of water to effect coagulation into a microporous structure. After removal of DMF by washing with water, the product was dried in hot air at 90° C.

The film obtained was smooth on the surface and had a soft touch because of the microporous structure. It possessed excellent durability and was readily adapted to be attached to a soft substrate and finished by coloring to give an imitation leather.

EXAMPLE 5

357 parts of polytetramethylene ether glycol, 355 parts of p,p'-diphenylmethane diisocyanate and 97 parts of tetramethylene glycol, were reacted together and then 237 parts of polyethylene propylene adipate glycol (ethylene:propylene=9:1) were added and the reaction was continued until the synthesis of the polyurethane elastomer was concluded. This polyurethane elastomer had a nitrogen content of 3.8 percent. While it contained both polytetramethylene ether (60 mole percent) and polyethylene propylene adipate (40 mole percent) as soft segments, the two were found to be distributed in a blocks.

A solution was prepared from 25 percent of this polyurethane elastomer, 72 percent of DMF, 1.5 percent of sorbitan monostearate and 1.5 percent of stearyl alcohol.

A non-woven fabric formed of 2-denier nylon-6 staple fiber was impregnated with the solution thus prepared, and a solution consisting of 22 percent of the above polyurethane elastomer, 76.5 percent of DMF, 0.5 percent of stearyl alcohol, and 1 percent of carbon black was applied to one side of the fabric to give a layer having a thickness of 0.8 mm. The fabric so impregnated and coated was dipped in a coagulation bath composed of 50 percent of DMF and 50 percent of water at 50° C and was thereby coagulated. After removal of DMF by washing with water, the fabric was dried, and finished by embossing and coloring to give a sheet material.

This sheet material had a soft touch and also good resistance to hot water and alkalis.

What we claim is:

1. A sheet material comprising a microporous layer of a polyurethane elastomer derived from a polyester glycol having a molecular weight of from 800 to 3000 selected from the group consisting of polycaprolactone and a polycondensation product of an aliphatic dicarboxylic acid and a glycol selected from the group consisting of ethylene glycol, propylene glycol, butylene glycol, hexamethylene glycol or mixtures thereof and a polyether glycol having a molecular weight of from 800 to 3000 selected from the group consisting of polyethylene ether glycol, polypropylene ether glycol, polytetramethylene ether glycol, polyhexamethylene ether glycol, polyethylene propylene ether glycol and a block copolyether of ethylene oxide and tetramethylene oxide, an organic diisocyanate, and a glycol chain extender having two active hydrogen atoms selected from the group consisting of ethylene glycol, propylene glycol, butylene glycol and hexamethylene glycol, the molar ratio of the polyester glycol to the polyether glycol being 10:90 to 65:35;

the weight of nitrogen atoms in the urethane groups being from 3.8 to 6 percent of the total weight of the elastomer.

2. A sheet material as claimed in claim 1 in which the weight of nitrogen atoms in the urethane groups is from 3.8 to 4.2 percent of the total weight of the elastomer.

3. A sheet material as claimed in claim 1 in which the aliphatic dicarboxylic acid is adipic acid or sebacic acid.

4. A sheet material as claimed in claim 1 in which the organic diisocyanate is an aromatic diisocyanate.

5. A sheet material as claimed in claim 4 in which the aromatic diisocyanate is a naphthalene diisocyanate, a diphenylmethane diisocyanate, a diphenyl diisocyanate or a tolylene diisocyanate.

6. A sheet material as claimed in claim 1 in which the organic diisocyanate is an aliphatic diisocyanate.

7. A sheet material is claimed in claim 6 in which the aliphatic diisocyanate is hexamethylene diisocyanate.

* * * * *